United States Patent
Ursel et al.

(10) Patent No.: US 6,831,381 B2
(45) Date of Patent: Dec. 14, 2004

(54) ELECTRIC DRIVE, ESPECIALLY FOR MOTOR VEHICLES

(75) Inventors: Eckhard Ursel, Buehl (DE); Bruno Droll, Buehl-Altschweier (DE); Walter Haussecker, Buehltertal (DE); Martin Karl, Sasbachwalden (DE); Wolfgang Thomar, Karlsruhe (DE); Stefan Freund, Gaggenau (DE); Thomas Huck, Rheinmuenster (DE)

(73) Assignee: Robert Bosch GmbH, Stuttgart (DE)

( * ) Notice: Subject to any disclaimer, the term of this patent is extended or adjusted under 35 U.S.C. 154(b) by 123 days.

(21) Appl. No.: 09/958,410
(22) PCT Filed: Feb. 9, 2001
(86) PCT No.: PCT/DE01/00507

§ 371 (c)(1),
(2), (4) Date: Jan. 24, 2002

(87) PCT Pub. No.: WO01/59912

PCT Pub. Date: Aug. 16, 2001

(65) Prior Publication Data

US 2004/0070296 A1 Apr. 15, 2004

(30) Foreign Application Priority Data

Feb. 12, 2000 (DE) .......................................... 100 06 350

(51) Int. Cl.⁷ ............................................... H02K 7/10
(52) U.S. Cl. ........................ 310/75 R; 310/83; 310/239
(58) Field of Search ........................... 310/75 R, 98–99, 310/128, 233, 239–248, 90, 91, 42, 83, 89, 188; 29/596, 597, 592; H02K 5/10, 7/10

(56) References Cited

U.S. PATENT DOCUMENTS

| | | | | |
|---|---|---|---|---|
| 3,026,432 A | * | 3/1962 | Baumhart | 310/239 |
| 3,087,081 A | * | 4/1963 | Apostoleris | 310/239 |
| 3,431,446 A | * | 3/1969 | Hansen et al. | 310/247 |
| 3,549,218 A | * | 12/1970 | Cagnon | 308/163 |
| 4,806,025 A | * | 2/1989 | Kamiyama et al. | 310/90 |
| 5,576,586 A | | 11/1996 | Blumenberg | |
| 6,759,783 B2 | * | 7/2004 | Hager et al. | 310/239 |

FOREIGN PATENT DOCUMENTS

| | | |
|---|---|---|
| DE | 35 00 723 A | 9/1985 |
| FR | 2 723 490 A | 2/1996 |
| GB | 2 152 294 A | 7/1985 |
| GB | 2152294 A * | 12/1994 |
| GB | 2152294 * | 12/1994 |

* cited by examiner

Primary Examiner—Burton S. Mullins
Assistant Examiner—Karen Addison
(74) Attorney, Agent, or Firm—Michael J. Striker

(57) ABSTRACT

In an electrical drive mechanism, in particular for motor vehicles, having a commutator motor (14) disposed in a housing (10), which commutator motor (14) has a rotor shaft (17) with a commutator (22) non-rotatably supported on it and has a brush holder (30) affixed to the housing (10), and having a bearing (25) disposed in the vicinity of the commutator (22), which bearing has a bearing bush (34) that encloses the rotor shaft (17) with rotary play and a bearing seat (35) that contains the bearing bush (34), in order to achieve a simple embodiment for the bearing (25), a clamping member (37) is formed onto the brush holder (30) of one piece with it, which clamps the bearing bush (34) in a frictionally engaged, axial fashion in the bearing seat (35) formed in the housing (10) (FIG. 1).

10 Claims, 2 Drawing Sheets

Figure 1:
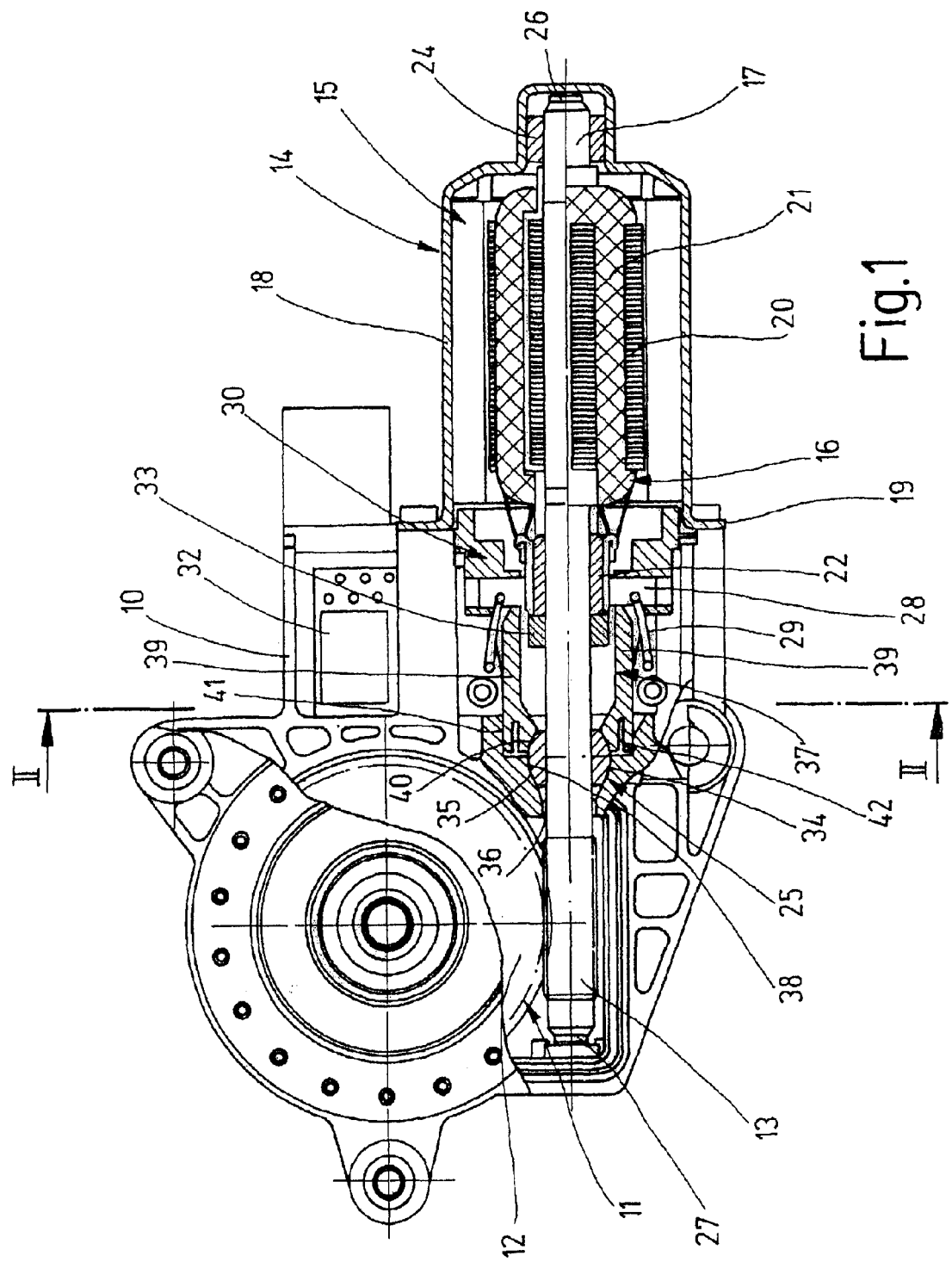

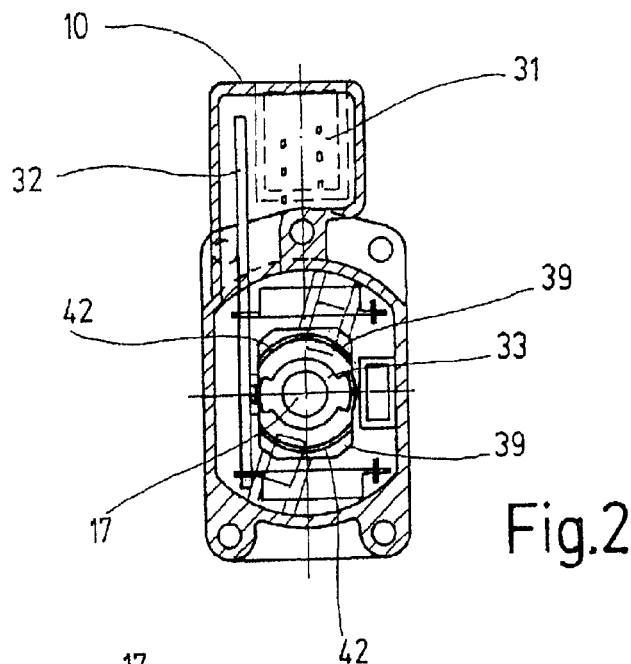
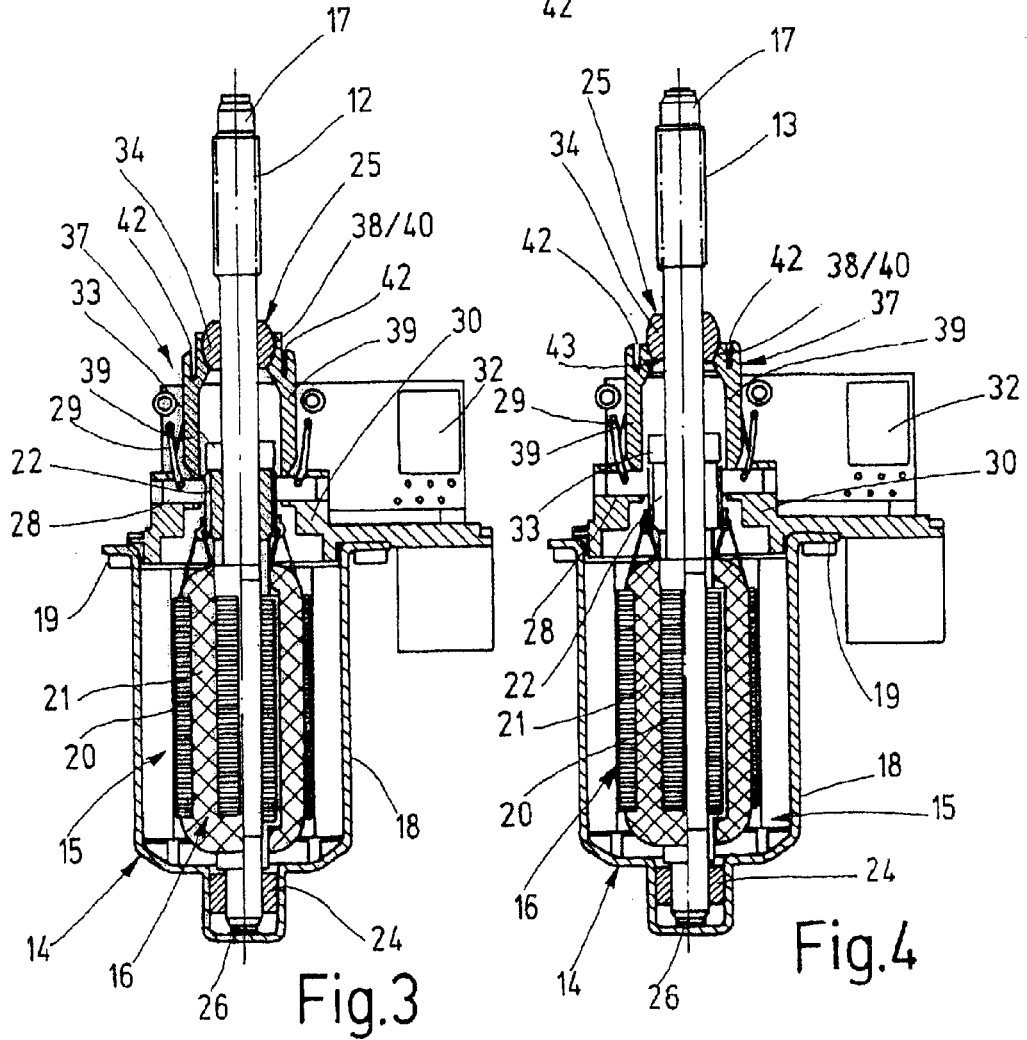
Fig.2
Fig.3
Fig.4

ELECTRIC DRIVE, ESPECIALLY FOR MOTOR VEHICLES

PRIOR ART

The invention is based on an electrical drive mechanism, particularly for motor vehicles, according to the preamble to claim 1.

In a known electrical drive mechanism of the type mentioned the beginning (U.S. Pat. No. 3,624,434), the commutator-end bearing is embodied as a dome-shaped bearing and is disposed inside a recess of a cap-shaped housing part. The bearing seat for the spherical segment-shaped bearing bush is constituted by an annular securing spring, which is inserted with an annular edge into the recess and, with a multitude of resilient fingers, which constitute the bearing seat, overlaps the half of the bearing bush oriented away from the commutator. As a result, the securing spring rests with an annular collar against the housing part and is clamped against the housing wall by a fastening plate, which supports the brush holder and has an opening coaxial to the rotor shaft, so that the securing spring is fixed in the recess of the housing part. The half of the bearing bush oriented toward the brush holder is overlapped by resilient fingers of a second securing spring, which constitutes the clamping member and is clipped into the opening of the fastening plate, where a collar of outer fingers engages behind the fastening plate and the securing spring is clamped to the fastening plate so that the inner resilient fingers exert an axial pressure on the bearing bush.

ADVANTAGES OF THE INVENTION

The electrical drive mechanism according to the engine has the advantage that the commutator-end bearing of the rotor shaft is comprised of only a few components, namely the bearing bush and the clamping member that constitutes an integral component of the brush holder. The bearing seat is produced already in the production of the housing so that it incurs no additional manufacturing expenditure. Since the clamping member is a component of the brush holder, the assembly of the drive mechanism is significantly simplified. The rotor shaft, which is equipped with an armature winding, commutator, brush holder, and bearing bush, is slid into the housing and in so doing, the bearing bush is inserted into the bearing seat, as a result of which the brush holder and therefore also the bearing bush are secured in place in the bearing seat. With that, the assembly is already finished. The assembly process can easily be automated with no trouble.

Advantageous modifications and improvements of the electrical drive mechanism disclosed in claim 1 are possible through the steps taken in the remaining claims.

According to a preferred embodiment of the invention, the clamping member is constituted by means of two spring-elastic securing arms, which are disposed on the brush holder and extend parallel to the rotor shaft on diametrically opposed sides of it and are supported with their free ends against contact bevels provided on the bearing bush, which bevels are embodied as inclined at an acute angle in relation to the rotor shaft on the side of the bearing bush oriented toward the brush holder. By embodying the bearing of the rotor shaft as a dome-shaped bearing, the contact bevels are constituted by circumference regions of the spherical segment-shaped bearing bush.

According to an advantageous embodiment of the invention, an annular fitting, which has a defined internal diameter and is supported in front of the bearing seat, is incorporated into the housing, and the free ends of the securing arms are inserted into this annular fitting. This annular fitting prevents the spring-elastic securing arms from splaying outward when being slid onto the bearing bush so that the securing arms exert a compressive force with an axial force component onto the bearing bush, which fixes the bearing bush in the bearing seat in a frictionally engaged manner. This frictional engagement between the bearing bush and the bearing seat prevents the rotor- or armature shaft from causing the bearing bush to rotate along with it, which would generate noise or cause a malfunction.

According to an advantageous embodiment of the invention, the bearing bush is also reliably prevented from rotating in the bearing seat along with the rotor shaft through the embodiment of reciprocally matched form-fitting elements on the bearing bush and bearing seat. For example, form-fitting elements can be provided on the surface of the bearing bush, which cooperate with matched opposing contours on the bearing seat and/or on the securing arms and as a result, secure the bearing bush in the bearing seat in a non-rotating manner. These form-fitting elements can be beads or flattenings. When the bearing of the rotor shaft is embodied as a dome-shaped bearing, the opposing contours must offer the possibility of being able to adapt to an inclined position of the armature shaft.

According to an advantageous embodiment of the invention, an arc-shaped slot is let into the end of each of the two securing arms. This slotting of the securing arms in their end regions can compensate for tolerances occurring in the axial and radial direction.

DRAWINGS

In the description below, the invention will be explained in detail in conjunction with an exemplary embodiment shown in partially schematic depictions in the drawings.

FIG. 1 shows a longitudinal section through a power window drive mechanism for motor vehicles, FIG. 2 shows a section along the line II—II in FIG. 1, FIG. 3 shows a partial view of a longitudinal section through an electric motor of the power window drive mechanism according to FIG. 1, FIG. 4 shows a representation of the electric motor equivalent to the one in FIG. 3, with a bearing bush.

DESCRIPTION OF THE EXEMPLARY EMBODIMENT

The electrical power window drive mechanism for a motor vehicle, which is shown in the partially schematic longitudinal section in FIG. 1, as an example for a typical electrical drive mechanism, has a housing 10 which contains a worm gear pair 11 with a worm gear 12, which is supported in rotary fashion in the housing 10, and a worm 13 that engages with this gear. A commutator motor 14 with a stator 15 and armature or rotor 16 is situated against the housing 10. The stator 15, which is equipped with permanent magnets, is contained in a pole housing 18 which is screwed to the housing 10 by means of a fastening flange 19. The rotor 16 has a laminar rotor body 20 and an armature winding 21, which is inserted into grooves of the rotor body 20 and connected to a commutator 22. The rotor body 20 and the commutator 22 are supported in a non-rotating fashion on a rotor shaft 17 which protrudes into the housing 10 and at its end, supports the worm 13 that engages with the worm gear 12 of the worm gear pair 11. The rotor shaft 17 is contained in a rotary fashion respectively by a first bearing 24 in the pole housing 18 and by a second bearing 25 in the housing 10 and is axially fixed by two axial support bearings 26 and 27. The second bearing 25 here is disposed between the commutator 22 and the worm 13, while the first bearing 24 is disposed at the end of the rotor 16 oriented away from the commutator 22. Power is supplied to the armature winding 21 in a known fashion via commutator brushes 28, also called carbon brushes, which are disposed in pairs on opposite sides of the commutator 22 and are pressed radially against the circumference of the commutator 22 by means of spring force. The commutator brushes 28 are secured to a brush holder 30 so that they can move in the radial direction of the commutator 22 and are electrically connected via a stranded brush conductor 29 to a motor plug 31 embodied on the brush holder 30. The motor electronics are accommodated on a printed circuit board 32 likewise affixed to the housing and the rotational angle and/or the rotation of the rotor shaft 17 is sensed by means of an annular magnet 33 supported in non-rotary fashion on the rotor shaft 17.

The first bearing 24 in the pole housing 18 is embodied as a cylindrical bearing, while the second bearing 25 oriented toward the commutator is embodied as a dome-shaped bearing 25. The dome-shaped bearing 25 has a centrosymmetrical, spherical, in particular spherical segment-shaped bearing bush 34, which encloses the rotor shaft 17 with rotary play, and a spherical cap-shaped bearing seat of 35 formed into the housing 10, which has a central opening 36 for the rotor shaft 17 to pass through. Approximately half of the bearing bush 34 is contained in a form-fitting manner by the bearing seat 35 and is supported in it in the axial direction. By means of a clamping member 37, which generates an axial clamping force directed toward the bearing seat 35, the bearing bush 34 is pressed into the bearing seat 35 so that the bearing bush 34 is secured in a frictionally engaged manner against rotation in the bearing seat 35. The clamping member 37 engages with contact surfaces 38 embodied on the surface of the bearing bush 34, which in the case of the dome-shaped bearing 25 depicted here, are constituted by the circumference regions of the bearing bush part protruding from the bearing seat 35.

In order to reduce manufacturing costs and to simplify the assembly of the power window drive mechanism, the clamping member 37 is a one-piece component of the brush holder 30 that is comprised of plastic. To this end, the brush holder 30 has a pair of spring-elastic securing arms 39, which extend parallel to the rotor shaft 17 and are disposed on diametrically opposite sides of the rotor shaft 17, which are supported with their free ends in a frictionally engaged manner against the contact surfaces 38 on the bearing bush 34, i.e. against the spherical surface of the part of the dome-shaped bearing bush 34 protruding from the bearing seat 35 and to this end, have correspondingly embodied, for example spherical or tangential, contact surfaces 40 on their ends. So that the securing arms 39 do not splay and move radially outward during operation and when pressing against the bearing bush 34, causing their compressive force for the bearing bush 34 to be lost, an annular fitting 41, which has a definite internal diameter and is supported in front of the bearing seat 35, is incorporated into the housing 10. When the housing 10 is slid onto the rotor shaft 17, the securing arms 39 are inserted into the annular fitting 41 and rest with their outer surface oriented away from the rotor shaft 17 against the cylindrical wall of the annular fitting 41. As shown in FIG. 2, the securing arms 39 arc embodied as arc-shaped segments that fit snugly into the annular fitting 41 at their ends. In the exemplary embodiment of FIGS. 1 and 2, in order to leave room for other structural elements, e.g. for the printed circuit board 32, only two segment-like securing arms 39 are provided. However, the number of securing arms 39 can be increased through further division of the segments. In order to be able to compensate for tolerances occurring in the axial and radial direction between the securing arms 39 and the bearing bush 34, an arc-shaped slot 42 is let into the end of each securing arm 39.

In order to assemble the power window drive mechanism, first the rotor 16 is completed by adding the rotor shaft 17, commutator 22, annular magnet 33, and bearing bush 34. Then the worm 13, whose outer diameter is greater than the inner diameter of the bearing bush 34, is rolled onto the end of the rotor shaft 17 and the rotor 16 is inserted into the stator 15 in this state. Then, starting from the free end of the rotor shaft 17, the brush holder 30 is slid onto the rotor shaft 17 until it rests against the stator 15. In order to facilitate assembly, preferably a mounting sleeve is used, which has an outer diameter virtually identical to the annular magnet 33 and the commutator 22 and encompasses the bearing bush 34 with resilient snap hooks. The mounting sleeve assures that the commutator brushes 28 protruding radially on the brush holder 30 do not get "hung up" on the corners of the annular magnet 33 and the commutator 22, thus preventing further installation of the brush holder 30. When the brush holder 30 is slid into place, the securing arms 39 on the brush holder 30 are splayed outward by the mounting sleeve. If the mounting sleeve is withdrawn again, then by means of its above-mentioned snap hooks, it causes the bearing sleeve 34 to move along with it so that the securing arms 39 spring back. Upon final withdrawal of the mounting sleeve, the bearing bush 34 is separated from the mounting sleeve by the larger diameter worm 13 and as a result of gravity—since the assembly is executed with a vertically aligned rotor shaft 17, falls down onto the securing arms 39 which have already sprung back. Then the housing 10 is fitted into place, as a result of which the bearing bush 34 presses into the bearing seat 35 and the free ends of the securing arms 39 press into the annular fitting 41. Then the pole housing 18 is a screwed to the housing 10. During the screwing process, the bearing bush 34 is automatically clamped into and secured in the correct support position in the housing 10, between the securing arms 39 of the brush holder 30 and the bearing seat 35. The securing arms 39 the are likewise automatically locked in place in the housing 10 by the annular fitting 41 and consequently, the securing arms 39 are prevented from springing outward as a result of axial stress. At the same time, the brush holder 30 is also fixed between the housing 10 and the pole housing 18.

When the housing 10 is slid over the rotor shaft 17, the rotor 16 is aligned in as exactly coaxial a fashion as possible in the pole housing 18 so that the rotor shaft 17 stands exactly vertical. The attraction force of the permanent magnets in the pole housing 18, however, causes the rotor 16 to strive to come to rest laterally against the stator 15. In order to prevent this—as shown in FIG. 3—the securing arms 39 are embodied as elongated so that they engage the bearing bush 34 beyond its center of symmetry. This achieves a support of the rotor shaft 17 and prevents the rotor shaft 17 from leaning to the side.

With the securing arms 39 on the brush holder 30 left unmodified, the same supporting effect is achieved by forming a cylindrical collar 43—as shown in FIG. 4—onto the side of the bearing bush 34 oriented toward the brush holder 30, which collar is supported against the free ends of the securing arms 39.

The invention is not limited to the exemplary embodiment described above. Thus, the required securing of the bearing bush 34 against rotation in the bearing seat 35 can also be achieved by embodying form-fitting elements on the bearing bush 34, which cooperate with matched opposing contours on the bearing seat 35 and/or on the securing arms 39 and as a result, reliably prevent the bearing bush 34 from rotating in the bearing seat 35. These form-fitting elements can be constituted by beads or flattenings. The opposing contours in the bearing seat 35 and/or on the securing arms 39, however, must give the dome-shaped bearing bush 34 the possibility of being able to adapt to an inclined position of the rotor shaft 17 since the latter is deflected within limits by the forces generated by the gearing of the worm.

The bearing that is oriented toward the commutator and is embodied as described above can also be used in other electrical drive mechanisms, e.g. in electrical drive mechanisms for windshield wipers. In such a case, if the worm gear pair is eliminated, then the bearing oriented toward the commutator can also be embodied as a cylindrical bearing. Support surfaces must then be provided in the bearing seat 35, against which the bearing bush can be supported in the axial direction and contact surfaces must be embodied on the bearing bush, which are inclined at an acute angle in relation to the rotor shaft 17 and against which the free ends of the securing arms 39 are supported in a frictionally engaged fashion.

What is claimed is:

1. An electrical drive mechanism, in particular for motor vehicles, having a housing (10), having a commutator motor (14) disposed in the housing (10); this commutator motor (14) has a rotor shaft (17), a commutator (22), which is non-rotatably supported on the rotor shaft (17) and connected to an armature winding (21) that rotates along with the rotor shaft (17), and a brush holder (30) that is affixed in the housing (10), with commutator brushes (28) resting against the circumference of the commutator (22), and having a bearing (25) disposed in the vicinity of the commutator (22), which is comprised of a bearing bush (34) that encloses the rotor shaft (17) with rotary play, a bearing seat (35) that contains the bearing bush (34) and has support surfaces for axially supporting the bearing bush (34), and a clamping member (37) that clamps the bearing bush (34) in the bearing seat (35) against the support surfaces in a frictionally engaged fashion, wherein the clamping member (37) is a one-piece component of the brush holder (30) that is preferably comprised of plastic, characterized in that a worm (13) of a worm gear pair (11) is embodied on the rotor shaft (17) so that it is of one piece with the rotor shaft (17) and has a greater outer diameter than the rotor shaft (17), and in that the bearing bush (34) located between the worm (13) and the commutator (22) is slid onto the rotor shaft (17) before completion of the worm (13).

2. The electrical drive mechanism according to claim 1, characterized in that an annular fitting (41), which has a defined internal diameter and is supported in front of the bearing seat (35), is incorporated into the housing (10), and the free ends of the securing arms (39) are inserted into this annular fitting (41).

3. The electrical drive mechanism according to claim 2, characterized in that the internal diameter of the annular fitting (41) is determined so that the securing arms (39) are prevented from splaying outward during operation and when being slid against the contact surfaces (38) on the bearing bush (34).

4. The electrical drive mechanism according to claim 1, characterized in that an arc-shaped slot (42) is let into the end of each of the securing arms (39).

5. The electrical drive mechanism according to claim 1, characterized in that the bearing bush (34) has form-fitting elements embodied in its surface, which is non-rotatably secured in the bearing seat (35) with matched opposing contours on the bearing seat (35) and/or securing arms (39).

6. The electrical drive mechanism according to claim 1, characterized in that the bearing (25) is embodied as a dome-shaped bearing whose spherical cap-shaped bearing seat (35), with a central opening (36) for the rotor shaft (17) to pass through, contains approximately half of the centrosymmetrical, spherical segment-shaped bearing bush (34), and in that the contact surfaces (38), which are disposed on the bearing bush (34) and are intended for the securing arms (39), are constituted by circumference regions of the part of the bearing bush protruding from the bearing seat (35).

7. The electrical drive mechanism according to claim 6, characterized in that a cylindrical collar (43) is formed onto the end of the bearing bush (34) oriented toward the brush holder (30) and is supported against the free ends of the securing arms (39).

8. The electrical drive mechanism according to claim 6, characterized in that the securing arms (39) are embodied so that they engage the bearing bush (34) beyond its center of symmetry.

9. The electrical drive mechanism according to claim 1, characterized in that the commutator motor (14) has a rotor (16), which supports the armature winding (21), and a stator (15), which encompasses the rotor (16) and is contained in a pole housing (18) that is flange-mounted to the housing (10), and in that on its side oriented away from the clamping member (37), the brush holder (30) is supported in the axial direction against the stator (15) and/or the pole housing (18).

10. An electrical drive mechanism, in particular for motor vehicles, having a housing (10), having a commutator motor (14) disposed in the housing (10); this commutator motor (14) has a rotor shaft (17), a commutator (22), which is non-rotatably supported on the rotor shaft (17) and connected to an armature winding (21) that rotates along with the rotor shaft (17), and a brush holder (30) that is affixed in the housing (10), with commutator brushes (28) resting against the circumference of the commutator (22), and having a bearing (25) disposed in the vicinity of the commutator (22), which is comprised of a bearing bush (34) that encloses the rotor shaft (17) with rotary play, a bearing seat (35) that contains the bearing bush (34) and has support surfaces foraxially supporting the bearing bush (34), and a clamping member (37) that clamps the bearing bush (34) in the bearing seat (35) against the support surfaces in a frictionally engaged fashion, wherein the clamping member (37) is a one-piece component of the brush holder (30) that is preferably comprised of plastic, characterized in that the clamping member (37) has at least one pair of spring-elastic securing arms (39), which are disposed on the brush holder (30), extend parallel to the rotor shaft (17), and are disposed on diametrically opposite sides of it, wherein an annular fitting (41), which has a defined internal diameter is incorporated into the housing (10), and the free ends of the securing arms (39) are inserted into this annular fitting (41), and wherein the internal diameter of the annular fitting (41) is determined so that the securing arms (39) are prevented from splaying outward during operation.

* * * * *